United States Patent [19]

Fantar

[11] Patent Number: 5,209,437
[45] Date of Patent: May 11, 1993

[54] PROCESS FOR THE CONTROL OF A SPACE CRAFT PERFORMING A PRECESSION MOVEMENT AND APPARATUS FOR THE REALIZATION THEREOF

[75] Inventor: Fahem Fantar, De Gaulle Sartrouville, France

[73] Assignee: Aerospatiale Societe Nationale Industrielle, Paris, France

[21] Appl. No.: 754,977

[22] Filed: Sep. 4, 1991

[30] Foreign Application Priority Data

Sep. 6, 1990 [FR] France .................................. 90 11072

[51] Int. Cl.[5] .............................................. B64G 1/24
[52] U.S. Cl. .................................... 244/164; 244/171; 244/3.15; 364/434
[58] Field of Search ............... 244/171, 169, 164, 3.15, 244/158 R; 364/455, 459, 434

[56] References Cited

U.S. PATENT DOCUMENTS

| | | | |
|---|---|---|---|
| 3,652,042 | 3/1972 | Welther | 244/1 SS |
| 3,811,641 | 5/1974 | Hopper | 244/171 |
| 3,866,025 | 2/1975 | Cavanagh | 235/150.2 |
| 3,937,423 | 2/1976 | Johansen | 244/169 X |
| 3,984,072 | 10/1976 | von Pragenau et al. | 244/171 |
| 4,230,294 | 10/1980 | Pistiner | 244/171 |
| 4,617,634 | 10/1986 | Izumida et al. | 364/434 |
| 4,786,018 | 11/1988 | Cope | 244/164 |
| 4,837,699 | 6/1989 | Smay et al. | 364/434 |
| 5,067,673 | 11/1991 | Fong | 244/191 |
| 5,107,434 | 4/1992 | Paluszek | 244/164 |

FOREIGN PATENT DOCUMENTS

0225683 6/1987 European Pat. Off. .

OTHER PUBLICATIONS

Astronautics & Aeronautics, V916A 6, (May 1968), 5, "Orbital Shuttle" pp. 54-62 by: Donald F. Adamski.

*Primary Examiner*—Sherman Basinger
*Assistant Examiner*—Christopher P. Ellis
*Attorney, Agent, or Firm*—Hayes, Soloway, Hennessey & Hage

[57] ABSTRACT

Apparatus and process for successive (stepwise) position control of a spacecraft undergoing precession, in preparation for release of at least one payload therefrom, are provided.

In order to bring the longitudinal axis of the craft from an initial position to a predetermined position to be reached, the positions are referenced with respect to an inertial frame of reference, during each control step. The angular velocity of the craft is dependent on the variation between the position to be reached and the position of the craft at the end of the preceding control step and dependent on the velocity of the craft during the preceding control step.

6 Claims, 2 Drawing Sheets

PROCESS FOR THE CONTROL OF A SPACE CRAFT PERFORMING A PRECESSION MOVEMENT AND APPARATUS FOR THE REALIZATION THEREOF

BACKGROUND OF THE INVENTION

1. Field Of The Invention

The present invention relates to a process for the control of a space craft performing a precession movement and to an apparatus for the realization thereof. It more particularly relates to the positioning of the upper stage of a launcher prior to the release of payloads (satellites).

The positioning of the upper launcher stage prior to the release of payloads is a crucial problem in space missions, because it conditions the satisfactory placing in orbit of said payloads.

A rapid precession movement (5 r.p.m. or higher) permits a good gyroscopic stabilization of a payload during its travel between the release orbit and its operating orbit. During this travel, a released payload without a precession movement and only having a limited transverse velocity, will deviate from its nominal direction. This deviation must be made good by a putting into operation of the jet pipes or nozzles, which results in a significant energy loss, which reduces the life of the satellite, which is intimately linked with its fuel reserves.

The application of a parasitic transverse velocity to a payload performing a precession movement does not modify its general orientation. The payload only has a rotational movement in accordance with a cone directed around the general orientation axis. Thus, it is merely necessary at the release of the payload for said orientation axis to be close to the nominal direction in order to retain this precision throughout the orbit transfer and without using an active check for putting the nozzles into operation. Thus, significant energy savings result.

FIGS. 1a to 1f show a known sequence of operations for the successive release of two payloads. FIG. 1a shows the upper stage 10 of the launcher and two payloads 12, 14. Payload 12 has been released and is moving away from the stage 10. Payload 14 is still contained in the protecting Spelda or Sylda-type structure 16.

Arrows 18 and 20 indicate the precession movements of the upper stage 10 and the payload 12 about the longitudinal axis X1. Following the release of the first payload 12, during a second stage shown in FIG. 1b, the precession movement of the upper stage is stopped. During the following stage shown in FIG. 1c, the upper part 16a of the Spelda is ejected revealing the second payload 14 contained in the lower part 16b of the Spelda.

The upper stage 10 is then tilted into the release position for the second payload 14. This operation is shown in FIG. 1d, where the arrow 22 symbolizes the tilt.

FIG. 1e shows the placing in precession of the upper stage 10 symbolized by the arrow 24. FIG. 1f diagrammatically shows the release of the second payload 14 performing a precession movement symbolized by the arrow 26.

FIGS. 1a to 1f show six nozzles 1 to 6 distributed in the form of two sets of three nozzles positioned on the stage 10 so as to supply rotational movements in the pitch-yaw plane (in order to obtain precession movements), as well as those necessary for the tilting.

Conventionally, the positioning of the stage 10 takes place when the latter is stabilized, i.e. without a precession movement and the precession movement is then imposed thereon. No checking with respect to the orientation of the longitudinal axis X1 of the upper stage 10 is carried out following its placing in precession. The direction of the axis X1 during the release of the payload can be subject to error inter alia due to the dynamic unbalance of the assembly formed by the launcher and the payload or nozzle installation errors. Therefore this error must be made good, which involves considerable energy losses prejudicial to the long life of the payload. This type of release is normally called open loop spin release.

SUMMARY OF THE INVENTION

The control process according to the invention permits the orientation of a space craft and in particular an upper launcher stage containing one or more payloads, when the latter is performing a precession movement about its longitudinal axis. For this purpose the invention recommends the use of gyroscopic torques produced by the precession movement for directing the longitudinal axis of the space craft, the control being based on velocity controls dependent on the variation between an angular position to be reached and the position of the craft in time. This type of control is based on a series of measurements of the angular velocity in a frame of reference attached to the launcher and the angular position of the craft in an absolute (inertial) frame of reference. The predetermined release position is reached by an updating of the angular velocity. As opposed to open loop spin release, this type of release can be called closed loop spin release.

It is known that for a good check or control of the precession axis, it is necessary for the gyroscopic torques to be equal to or below approximately 30% of the driving torques. This condition which was considered to be a serious constraint in the prior art and which prevented any orientation modification following placing in precession, is not prejudicial to control based on the use of gyroscopic torques.

The process according to the invention does not require a very fine minimum impulse bit (MIB) as opposed to open loop spin release. The minimum impulse bit is a characteristic parameter of a nozzle. It specifies the minimum nozzle opening time to obtain a given power.

For an open loop release, the MIB must be low, because a very precise positioning and a low tilt velocity of the longitudinal axis of the space craft are necessary before placing in precession. However, when the position of the upper stage is checked during the precession movement, the MIB no longer has to be as low, which simplifies construction and the settings of the sets of nozzles or jet pipes used.

Finally, the process according to the invention makes it possible to merge into one the tilt operations and the placing in precession operations shown in FIGS. 1d and 1c, which leads to a considerable time and energy saving.

More specifically, the present invention relates to a process for the control of a space craft having a precession movement about its longitudinal axis, the craft being provided with displacement means and control taking place stepwise.

In order to bring the longitudinal axis of the craft from an initial position to a predetermined position to be reached, said positions being referenced with respect to an inertial frame of reference, during each control step, the craft has an angular velocity dependent on the variation between the position to be reached and the position of the craft at the end of the preceding control step and dependent on the velocity of the craft during the preceding control step.

The invention also relates to an apparatus for performing the process.

The invention is described in greater detail hereinafter relative to non-limitative embodiments and the attached drawings, wherein show:

DETAILED DESCRIPTION OF PREFERRED EMBODIMENTS

Figure 1A:
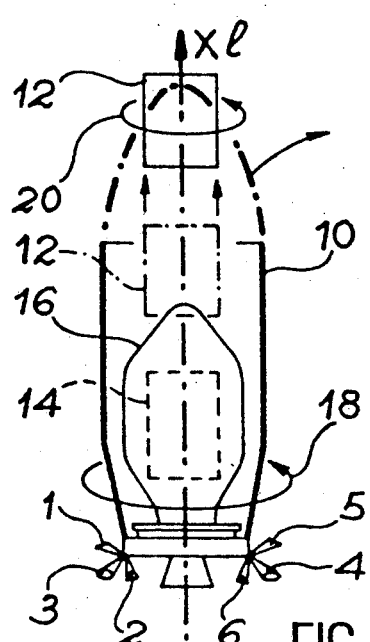
FIGS. 1a to 1f, already described and relating to the prior art, diagrammatically the release stages of a second payload following the release of a first payload.
Figure 1B:
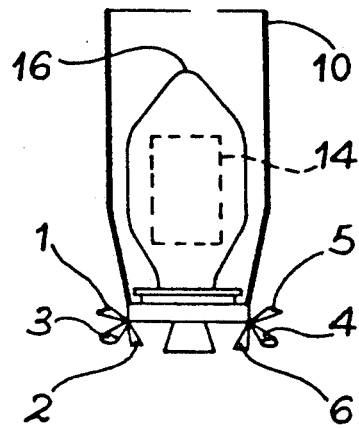
Figure 1C:
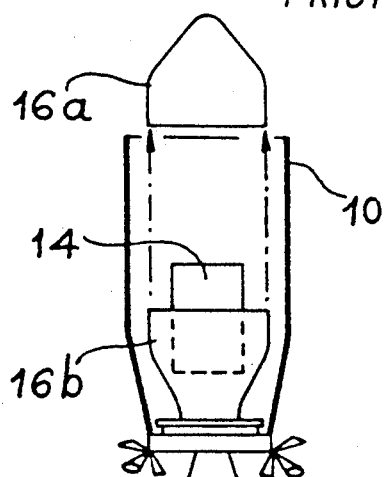
Figure 1D:
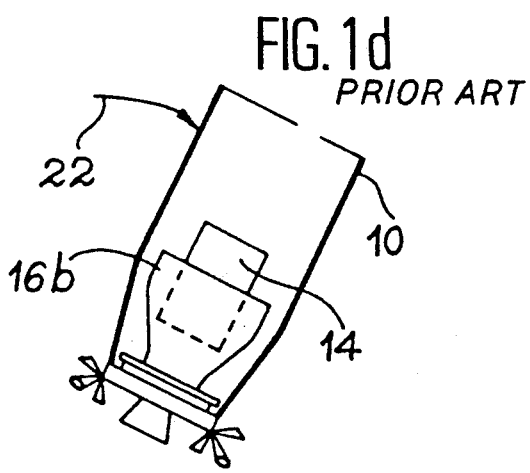
Figure 1E:
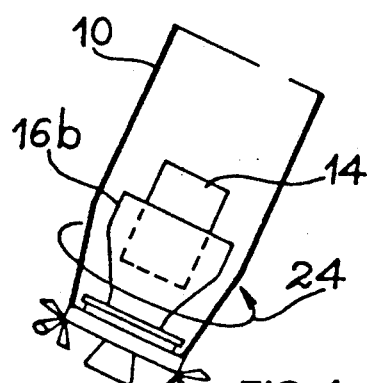
Figure 1F:
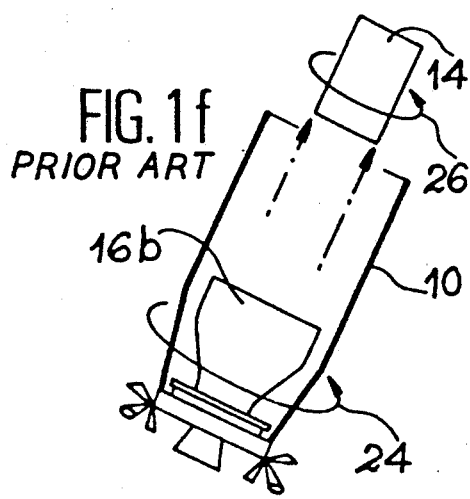
Figure 2:
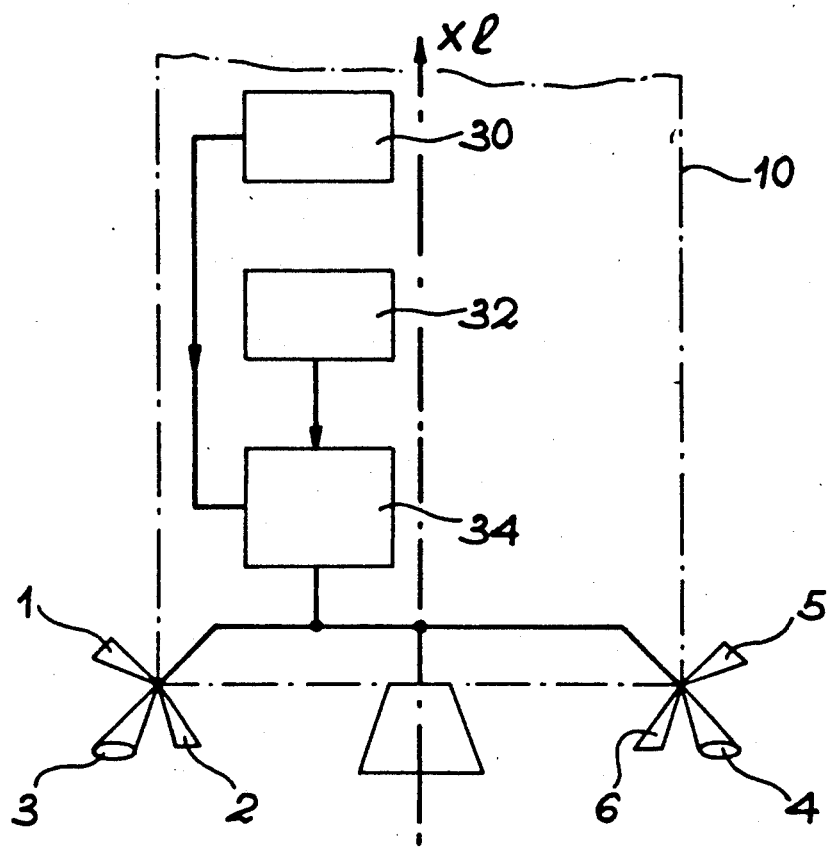
FIG. 2 Diagrammatically an apparatus for performing the process of the invention.

With reference to FIG. 2, a description will now be given of an apparatus contained in the upper stage 10 of the launcher and which makes it possible to perform the process according to the invention. The apparatus comprises at least one memory 30 and an inertia station 32, both being connected to a computer 34.

Prior to launch, the successive release positions of the payloads and any other position to be assumed by the craft are entered in the memory 30. These positions are marked relative to a fixed frame of reference. Apart from the precession velocity which is fixed and known, the pitch and yaw velocities of the craft in the release position are preferably zero in order to provide a better stability during the release of the payloads.

In addition, recording takes place of the driving torques which can be supplied by the displacement means of the upper stage 10, i.e. the lateral jet pipes or nozzles 1 to 6, which are generally identical and are therefore characterized by a single MIB, which is also recorded in the memory 30.

Other informations, such as inertial parameters of the assembly formed by the upper stage 10 and the payloads are also contained in the memory 30.

During flight and on arrival in the release orbit, the upper stage 10 is given a precession movement about its longitudinal axis and of velocity equal to e.g. 5 r.p.m. by putting into operation adequate sets of lateral nozzles.

According to the invention, the placing in the release position of a payload starts with the placing in precession and control normally takes place stepwise.

According to the invention, in order to bring the longitudinal axis of the upper stage 10 from its placing in precession position to the payload release position, for each control step, the upper stage 10 is given an angular tilt velocity dependent on the variation between the position to be reached and the position of the craft at the end of the duration of the preceding control step, said velocity being dependent on the angular velocity of the craft during the preceding control step.

At each control step, the inertia station 32 measures the angular velocity in a frame of reference linked with the launcher and the position of the upper stage 10 relative to a fixed frame of reference (absolute or inertial frame of reference).

Figure 3:
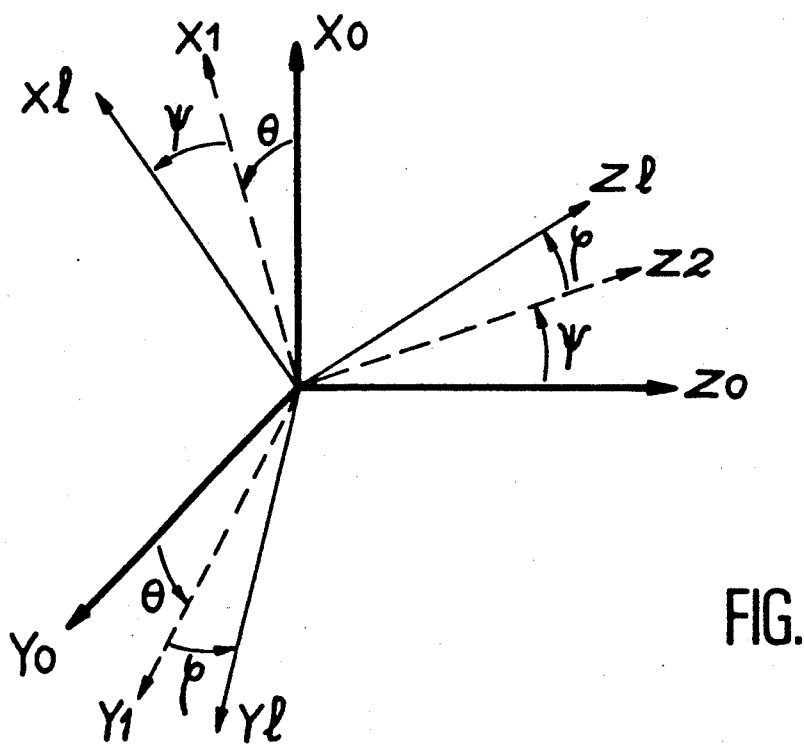
FIG. 3 Diagrammatically the passage from a fixed frame of reference to a mobile frame of reference by three successive rotations designated by the Eulerian angles.

FIG. 3 diagrammatically shows the reference frame X0, Y0, Z0 and a reference frame X1, Y1, Z1 attached to the craft and defining the Eulerian angles permitting the passage from one to the other by three successive rotations.

The first rotation by an angle $\theta$, called the nutation angle, about the axis Z0 passes the axes X0 and Y0 to intermediate axes X1 and Y1 respectively. The second rotation by an angle $\psi$, called the precession angle, about the axis Y1 passes the axes Y1 and Z0 to axes X1 and Z2 respectively. The third rotation by an angle $\phi$, called the self-rotation angle, about the axis X1 passes the intermediate axes Y1 and Z2 to axes Y1 and Z1 respectively. Assuming that X1 is the longitudinal axis of the upper stage 10 about which the precession movement takes place, the axes Y1, Z1 define a so-called pitch-yaw plane.

With reference to FIG. 2 and on the basis of the angular velocity measurement and the position, the computer 34 determines a transverse velocity (i.e. only having components in the pitch-yaw plane of the upper stage 10) necessary for reaching the position to be assumed by the upper stage 10 for the duration of the control step. This necessary velocity is theoretical and can often only be approached by the sets of nozzles, which only produce discreet velocity values.

The necessary transverse velocity is obtained by the integration of the depointing velocity, derived from the depointing angle, which is equal to the conjugate complex composition of the angles $\theta$ and $\psi$. This integration is carried out assuming that the angles $\theta$ and $\psi$ are small, e.g. below 10°.

This calculation is performed once and for all by fixing a theoretical passage time between the measured position and the position to be reached by the craft. In the case where each necessary theoretical velocity calculated for each control step can be produced by the sets of nozzles, the craft reaches its arrival position in this time, if not the passage is always longer. This theoretical time or duration is determined by considering the power and consumption characteristics of the nozzles. For each recorded driving torque, the computer 34 simulates thrusts during an action time varying in accordance with an increasing number of time increments.

As a function of the case, the time increments are not all equal. If the nozzle or set of nozzles put into operation for obtaining the desired thrust was previously inoperative, the first tested time increment is deduced from MIB. However, if the nozzle or set of nozzles is already in operation, the time increments are chosen equal to one another and as low as possible.

This number of time increments is limited by the duration of one control step, because this calculation is intended to determine which nozzle or set of nozzles has to be put into operation for obtaining a velocity as close as possible to the necessary transverse velocity.

For each pair (thrust-action time), the computer 34 compares the transverse velocity resulting from this torque with the necessary transverse velocity. The driving torque and action time making it possible to come as close as possible to the necessary transverse velocity are retained by the computer 34. The latter then controls the opening of the nozzle or set of nozzles for the given action time, so as to supply the selected driving torque.

This sequence of operations is performed for each control step until the release position is reached. The process is repeated for each payload to be released.

We have seen that the necessary transverse velocity was calculated on the basis of the hypothesis that the angles to be covered in order to reach the release position from the position of the craft were small. When the variation between the position to be reached and the position of the craft exceeds a previously fixed threshold, the angular velocity and more particularly the transverse velocity is made dependent on a maximum predetermined variation dependent on this threshold. This clipping or limiting makes it possible to constantly respect the calculation hypotheses (small angles) and avoids the computer calling for excessive power levels from the nozzles, which would mean that their capacity was exceeded or excessive energy would be consumed.

Thus, this clipping or limiting makes it possible with the control process to carry out large angle tilts of the longitudinal axis X1. Thus, if a large amplitude rotation is necessary for reaching the sought position, calculation takes place for each control step of an intermediate position to be reached and whose variation with respect to the current position is less than the previously fixed threshold. With time, these intermediate positions tend towards the final sought position.

The process according to the invention also makes it possible to ensure the necessary positioning accuracy of payloads, even in the presence of disturbing torques or a dynamic unbalance of the assembly formed by the upper launcher stage and its payload. The unbalance and the disturbing torques can be estimated in known manner, e.g. by a Kalman filter and are taken into account by the pilot for calculating controls.

The control process according to the invention and the apparatus for performing the same make it possible not only to direct a craft having a precession movement, but also a craft stabilized in accordance with its three axes (no precession movement). For this purpose it is merely necessary for the precession velocity to move towards zero in the calculation of the necessary transverse velocity.

Thus, a craft provided with this process and apparatus only requires a single pilot for positioning it no matter whether it has or has not a precession movement.

I claim:

1. A process for position control of a spacecraft undergoing a predetermined precession movement about its longitudinal axis in preparation for release of at least one payload therefrom, said craft having displacement means capable of imparting driving thrust and torque to said craft, said process comprising the steps of:
    a. predetermining and recording successive desired positions to be occupied by said craft at corresponding successive time intervals, driving torques impartable by said displacement means, and at least one minimum impulsion bit, said desired positions being determined relative to an inertial reference frame; and
    b. for each said successive time interval and corresponding desired position performing the following steps:
        i. determining said craft's actual angular velocity and actual position relative to said reference frame;
        ii. deriving from said craft's actual angular velocity and actual position a desired transverse velocity to be imparted to said craft to permit said craft to move into desired position;
        iii. determining from among said recorded driving torques one driving torque to be imparted to said craft and determining a driving time which permit said craft to achieve said transverse velocity;
        iv. actuating, for said driving time, said displacement means such that said displacement means imparts said one driving torque to said craft; and
        v. repeating steps i-iv until said craft moves into desired position.

2. A process according to claim 1, wherein determination of said one driving torque from among said recorded driving torques and determination of said driving time comprise the steps of:
    (a) dividing each said time interval into time increments;
    (b) calculating simulated transverse velocities obtainable from said recorded driving torques and time increments;
    (c) comparing simulated transverse velocities produced at step (b) with said desired transverse velocity to find one simulated transverse velocity which most closely approximates said desired velocity; and
    (d) selecting the recorded driving torque and time increment from which said one simulated transverse velocity may be obtained.

3. A process according to claim 2, wherein said time increments begin at a first time increment whose duration is derived from a minimum impulsion bit needed to permit said displacement means, beginning when inoperative, to impart said one driving torque to said craft.

4. A process according to claim 1, wherein said time intervals are of predetermined equal duration.

5. A process according to claim 1, wherein, if the actual position of said craft differs from desired orientation by more than a fixed threshold, said transverse velocity is based on a maximum predetermined variation thereof derived from said fixed threshold.

6. Apparatus for performing the process of claim 1, said apparatus comprising:
    a. recording means for recording said predetermined successive positions, said impartable driving torques, and said at least one minimum impulsion bit;
    b. a station located in said inertial reference frame for determining said craft's actual angular velocity and position, and being capable of determining said transverse velocity;
    c. means for selecting said one driving torque and driving time; and
    d. means for controlling said displacement means.

* * * * *